(No Model.)
J. C. HAGERTY.
BARK CUTTER.
No. 332,797. Patented Dec. 22, 1885.
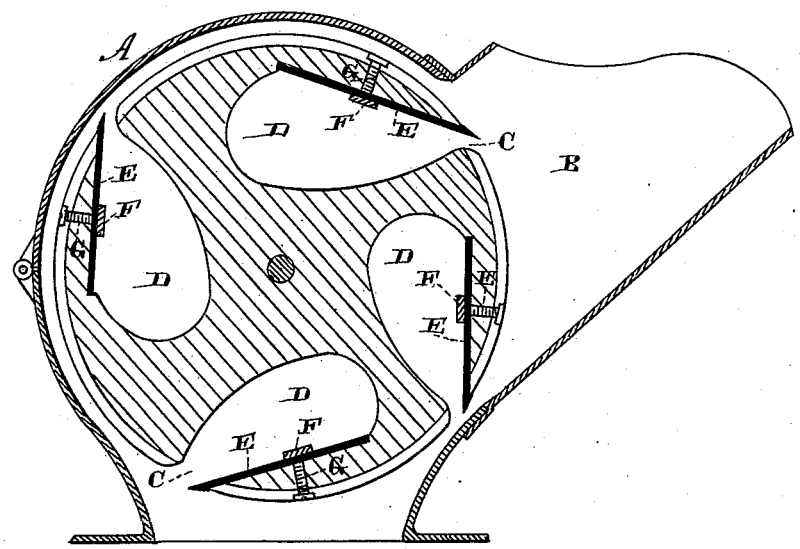
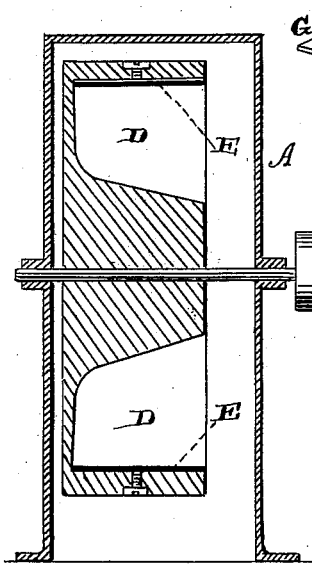
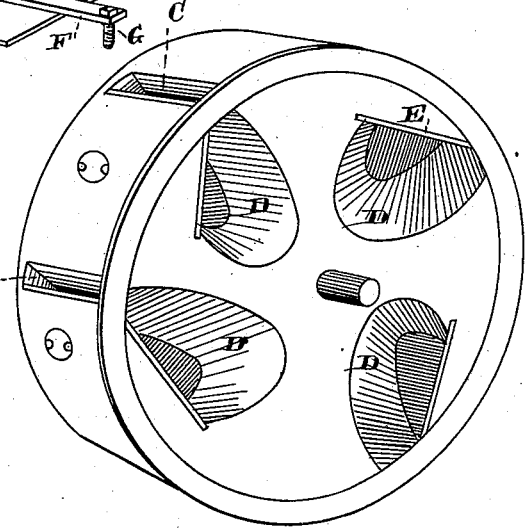
Witnesses,
Geo. H. Strong.
J. H. _____
Inventor,
J. C. Hagerty
By
Dewey & Co.
Attorneys.

UNITED STATES PATENT OFFICE.

JOHN C. HAGERTY, OF SANTA CRUZ, CALIFORNIA.

BARK-CUTTER.

SPECIFICATION forming part of Letters Patent No. 332,797, dated December 22, 1885.

Application filed April 20, 1885. Serial No. 162,841. (No model.)

*To all whom it may concern:*

Be it known that I, JOHN C. HAGERTY, of Santa Cruz, Santa Cruz county, State of California, have invented an Improvement in Bark-Cutters; and I hereby declare the following to be a full, clear, and exact description of the same.

My invention relates to an improved apparatus for cutting and reducing bark for tanners' use.

The machine consists of a cylindrical drum rotating within a casing which is provided with a chute or hopper, through which the bark is brought in contact with the periphery or face of the drum. Through the face of the drum slots are made, which communicate with chambers in its interior, these chambers having straight sides nearest the periphery of the drum to receive straight-bladed cutting-knives, and are enlarged and curved at their rear inner portions, which are at the same time inclined and spread or flared to open outwardly toward the end of the cylinder, so that the bark which is cut off by the knives as the cylinder rotates will pass into the chambers, and be thrown outwardly from them by the inclination and flare or funnel shape of their inner rear portions. The bark will be discharged into the space between the side of the drum and the surrounding casing without being allowed to pass into the interior of the drum or around the shaft.

Referring to the accompanying drawings for a more complete explanation of my invention, Figure 1 is a section taken through the case and drum transversely to the axis. Fig. 2 is a longitudinal section. Fig. 3 is a perspective view of the drum or cylinder, showing the arrangement and inclination of the interior chambers.

A is a casing having a hopper or chute, B, through which the bark is delivered against the periphery of the cylinder, preferably at considerable inclination. Through the surface of the drum are made slots C, which open rearwardly into chambers D, that are considerably enlarged at their rear and inner portions. That part of the chamber which is nearest the periphery of the drum is made flat and straight, so that the straight knife or cutter E may rest upon this flat portion with its edge projecting just beyond the edge of the opening and the periphery of the drum. These knives may be held in place by bolts passing through slots, which are made in the rear portions of the cutter-blades, or they may be held, and preferably so, by bars F, which extend across, so as to rest upon the surfaces of the blades. Each bar is drawn down tight against the blade by means of bolts G, passing through its ends at each side of the cutter-blade, and having nuts which screw upon them for the purpose.

That portion of the chamber D which is nearest the center of the drum or the shaft is considerably enlarged and made flaring or funnel-shaped, as shown, opening outwardly at the side of the drum, with an inclination outward and backward from the interior end, so that as the bark is cut off by the operation of the knife when the drum rotates it will pass into the interior of the chamber D, and, by the outward flaring or funnel shape of the mouth, will be caused to discharge toward the side of the casing, where there is sufficient space to allow it to pass between the side of the drum and the case, and thus escape through the opening at the lower part of the casing.

By this construction I am enabled to reduce the bark and discharge it rapidly without allowing it to enter the drum, and without depending upon centrifugal force to throw it out of the chambers.

Having thus described my invention, what I claim as new, and desire to secure by Letters Patent, is—

1. In a bark-cutting machine, the combination, with an inclosing-case, of a rotating drum or cylinder having slots in its periphery, said slots opening into chambers which are enlarged at their rear and inner portions and have flaring or funnel-shaped openings toward the side of the drum and suitable knives or cutters, substantially as herein described.

2. In a bark-cutting machine, the combination of an inclosing-casing and a rotating drum or cylinder having chambers formed within its periphery, said chambers having enlarged curved interiors and flaring or funnel-shaped openings toward the side of the drum, and knives or cutters projecting through slots made in the face of the drum and communicating with the chambers, the cut bark being discharged into the space between the side of the drum and the casing, substantially as herein described.

3. In a bark-cutting machine, the drum or cylinder having chambers with enlarged curved interiors and flat front sides, in combination with straight flat knives, clamping-bars extending across the same, and bolts and holding-nuts, substantially as herein described.

In witness whereof I have hereunto set my hand.

JOHN C. HAGERTY.

Witnesses:
S. H. NOURSE,
H. C. LEE.